United States Patent
Luick (10) Patent No.: US 7,188,227 B2
(45) Date of Patent: Mar. 6, 2007

(54) ADAPTIVE MEMORY COMPRESSION

(75) Inventor: David A. Luick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 10/675,428

(22) Filed: Sep. 30, 2003

(65) Prior Publication Data

US 2005/0071579 A1    Mar. 31, 2005

(51) Int. Cl.
*G06F 12/06*    (2006.01)

(52) U.S. Cl. ...................... 711/172; 711/171

(58) Field of Classification Search .............. 710/68; 711/171, 100, 162, 111, 112, 172
See application file for complete search history.

(56) References Cited

U.S. PATENT DOCUMENTS 5,802,553 A * 9/1998 Robinson et al. .......... 711/103
5,805,932 A * 9/1998 Kawashima et al. ........ 711/111
5,812,817 A    9/1998 Hovis et al. ........... 395/497.04
6,442,659 B1 * 8/2002 Blumenau ................... 711/162
2002/0083238 A1 * 6/2002 Naka et al. ................. 711/171

* cited by examiner

*Primary Examiner*—Pierre-Michel Bataille
(74) *Attorney, Agent, or Firm*—Patterson & Sheridan LLP (57) ABSTRACT

Compressed memory systems and methods that reduce problems of memory overflow and data loss. A compression engine compresses blocks of data for storage in a compressed memory. A compression monitor monitors the achieved compression ratio and provides a software trap when the achieved compression ratio falls below a minimum. After the trap is provided software monitors the fill state of the compressed memory. If the compressed memory is approaching full, the software changes the block size to improve the compression ratio.

22 Claims, 6 Drawing Sheets

ADAPTIVE MEMORY COMPRESSION

CROSS-REFERENCE TO RELATED APPLICATIONS

Field of the Invention

The present application is related to commonly-owned U.S. Pat. No. 5,812,817, entitled "Compression Architecture for System Memory Application" and commonly owned co-pending application, entitled "Automatic Temporary Precision Reduction For Enhanced Compression," filed herewith Ser. No. 10/675,427, which are herein incorporated by reference.

BACKGROUND OF THE INVENTION

1. Field of the Invention

The present invention relates to computer memory architectures and, more particularly, to maintaining an amount of available memory using adaptive compression techniques.

2. Description of the Related Art

Computer memory systems have at least two major problems: there is seldom enough memory and what memory there is tends to be expensive. Unfortunately, high performance computing, e.g. computer gaming, demands large amounts of fast memory. Memory is often the most expensive component of many computer architectures.

One way of reducing the cost of memory is to use data compression techniques. When data is compressed, more information can be stored in a given memory space, which makes the memory appear larger. For example, if 1KB of memory can store 2KB of uncompressed data, the memory appears to be twice as large as it really is. Thus, system cost may be reduced as only half the actual physical memory may be required.

Historically, compression was not been widely used because of difficulties associated with memory space management. For example, a computer that uses compressed memory must accommodate the variable length data that results from the compression. In addition, the computer must have compressed data directories and must include cache areas (working spaces) for uncompressed data. High performance computing represents an additional problem since the latency problems associated with compressing and uncompressing data must be overcome. That is, before compressed data can be used it must be uncompressed, which takes time, and then that data must be recompressed, which takes additional time, before storing. In some applications latency concerns are so severe that data compression historically could not be used. For example, computer gamers demand high speed graphics that operate without latency induced delays, glitches, or other visual defects.

U.S. Pat. No. 5,812,817, issued to Hovis et al. on Sep. 22, 1998, entitled, "Compression Architecture for System Memory Application" teaches useful memory architectures that store both uncompressed and compressed data. Having both types of data is useful since, in practice, most data accesses are to a relatively small amount of the total data. By storing often accessed data in the uncompressed state, and by storing less frequently accessed data in the compressed state, the teachings of U.S. Pat. No. 5,812,817 can significantly reduce latency problems associated with compressed data.

Computer hardware designers can use the teachings of U.S. Pat. No. 5,812,817 to increase the apparent size of memory. By incorporating a memory of a known size, and by incorporating a compression technique having an assumed minimum compression ratio, a hardware designer can inform software designers how much apparent memory they can assume is available. While in most cases an assumed minimum compression ratio is practical, some data simply does not compress well. In fact, some data compresses very little, if at all. Since poorly compressible data is fairly rare it is usually not a serious problem. Unfortunately, in high performance computing such huge amounts of similar data must be processed that when poorly compressed data does occur; there can be a lot of it. So, when poorly compressed data does occur the system memory is in danger of filling up. If the memory fills, data can be lost or data must be offloaded from memory (e.g., to a hard drive or "disk"), often resulting in a significant drop in system performance.

Since hardware designers recognize problems associated with filled memory they can provide hardware flags that signal software that memory might be approaching full. This technique, termed trapping to software, provides the software an opportunity to protect data. In some applications the software can simply store data in alternative memory devices, such as disk, or it can simply dump unneeded data, such as a previous display screen to free up more space. However, in applications such as computer gaming such approaches are usually unacceptable. Storing to disk dramatically increases latency issues while dumping a previous display is not a desirable option, as the display will very likely be required again.

Therefore, techniques of optimizing an amount of apparent memory using adaptive compression techniques would be useful, preferably, that mitigates latency issues.

SUMMARY OF THE INVENTION

The present invention provides methods, systems, and memory architectures for compressing data.

One embodiment provides a memory architecture for use with a computing device. The memory architecture generally includes a compressed memory for storing compressed data and a compression engine. The compression engine generally includes a compressor for compressing blocks of uncompressed data from a cache for storage in said compressed memory and a compression monitor for monitoring achieved compression ratios and for providing an indication when the achieved compression ratios falls below a predetermined threshold level, wherein the size of the blocks of data that are compressed by said compressor are controlled by block size data.

Another embodiment provides a system generally including a processor for processing data, a cache for storing, in an uncompressed format, data accessed by the processor, a compressed memory for storing data accessed by the processor in a compressed format, a compression engine and an executable component. The compression engine generally includes a compressor for compressing blocks of uncompressed data from the cache for storage in the compressed memory, wherein the size of the blocks of data that are compressed by said compressor are controlled by block size data, and a compression monitor for generating a software trap when achieved compression ratios fall below a predetermined threshold level. The executable component is generally configured to change the block size data in response to detecting the software trap.

Another embodiment provides a system generally including a processor for processing data, a cache for storing, in an uncompressed format, data accessed by the processor, a compressed memory for storing data accessed by the processor in a compressed format, and an executable component. The executable component is generally configured to monitor the available capacity of the compressed memory and, if the available capacity is below a threshold level, recompress data in the compressed memory previously compressed using a first block size, using a second larger block size.

Another embodiment provides a method of compressing memory. The method generally includes compressing data using a selected data block size to generate compressed blocks of data, storing the compressed blocks of data in a memory having a physical storage size, calculating a dynamic compression ratio calculated based on the selected data block size and the size of the compressed blocks, and increasing the data block size, in response to determining the dynamic compression ratio has fallen below a threshold level.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures.

DETAILED DESCRIPTION OF THE PREFERRED EMBODIMENT

The present invention provides for a memory architecture in which frequently accessed data is stored in an uncompressed format in a high speed cache to reduce latency. When the data is not being accessed, it is compressed and stored in a main memory store (system memory). In an effort to maintain an expected level of compression, one or more compression parameters are adapted based on a dynamic compression ratio generated from one or more actual achieved compression ratios. For some embodiments, the dynamic compression ratio may be monitored in hardware and, if it falls below a specified threshold level, the hardware generates a trap to software, allowing the software to intelligently modify compression parameters based on system parameters, such as currently running tasks, the amount of available memory remaining, and the like.

Figure 1:
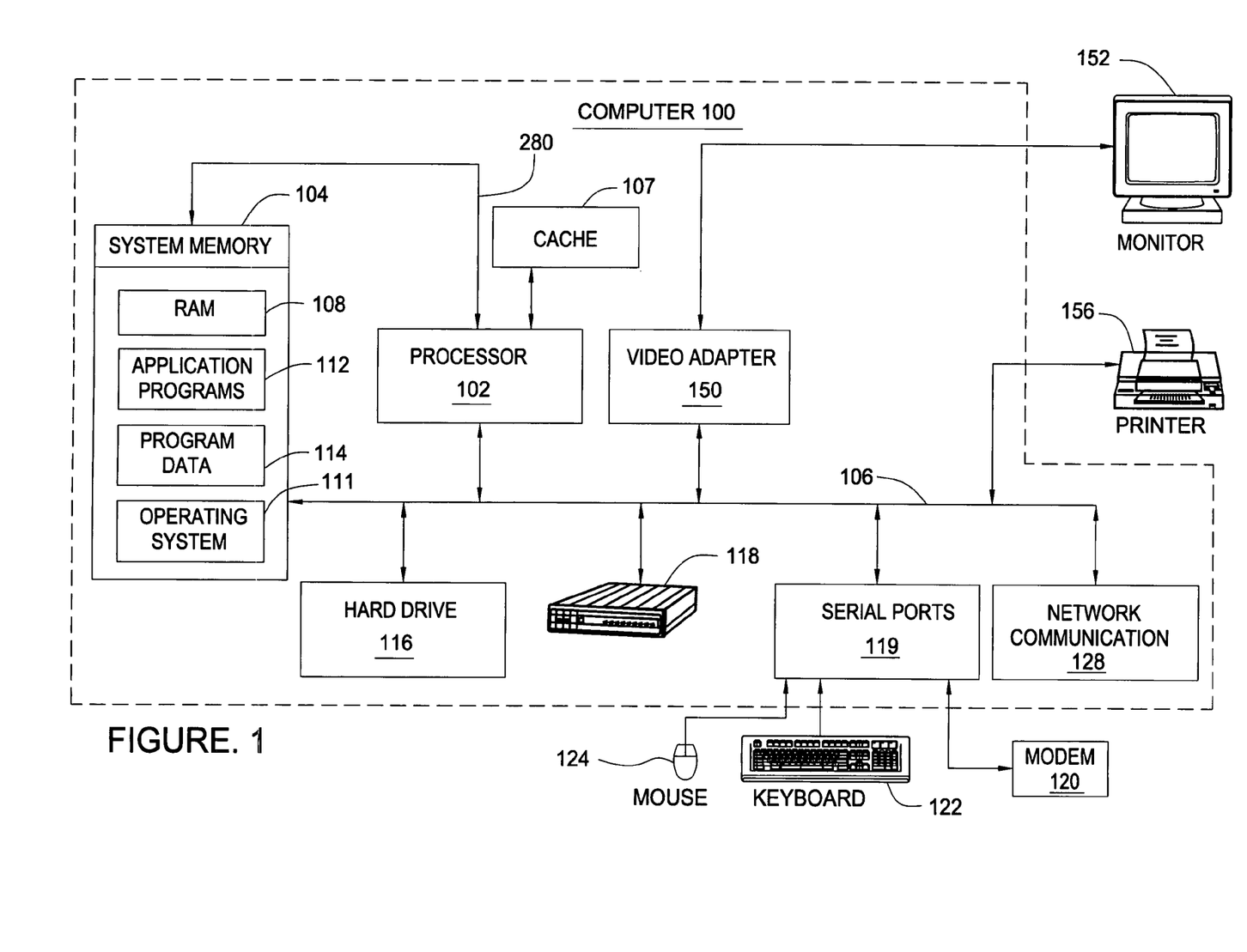
FIG. 1 is a schematic illustration of a computer system that incorporates the principles of the present invention.

FIG. 1 illustrates a computer 100 that incorporates the principles of the present invention. The computer 100 may represent a wide variety of computing devices, such as a conventional desktop computer, server, workstation, gaming device (e.g., a game box), portable or handheld device, network appliance, or any other type computing device. In any case, the adaptive compression techniques described herein may be utilized to increase the amount of apparent memory presented to an application and reduce overall system latency.

That computer 100 includes at least one processor 102 that is connected to a system memory 104 (e.g., RAM) via a system bus 106. As illustrated, one or more levels of high speed cache 107 may also be included within or physically near the processor 102. As illustrated, the system memory 104 may store an operating system 110, one or more application programs 112, and program data 114. As will be described in greater detail below, in order to improve system performance, frequently accessed portions of memory 104 may be stored in the cache 107, which the processor 102 may typically access at a much higher rate. The cache 107 may represent various levels of cache (e.g., L1 or L2), internal or external to the processor 102.

The computer 100 may also includes a hard drive 116 and/or an optical drive 118 and/or some other type of non-volatile memory for long-term data storage. The computer 100 also may also include input/output ports for a modem 120, a keyboard 122, a mouse 124, a network communication system 128, a video adaptor 150 which drives a monitor 152, and a printer 156. The video data should be understood as including a graphics processing system.

While the computer 100 is shown with a single system memory 104, in practice memory can be associated with any of the computer elements. For example, as illustrated, the processor 102 can have a local cache memory 107, as can the printer 156, the video adaptor 150, and any of the other computer elements.

Partitioned Memory

The system memory 104 may be partitioned to store both compressed and uncompressed data. Compressed data is highly advantageous from a cost viewpoint because has the effect of providing the processor 102 with much a larger apparent memory capacity than what is physically present, thus enabling more data to be stored in a given memory size. Many compression techniques are widely available and well known. Compressing data adds to the memory latency of data accesses. In addition, prior to transferring portions of compressed data from system memory 104 to the cache 107, the compressed data must be de-compressed. However, since most memory accesses are to a relatively small percentage of data stored within the system memory 104, by leaving often accessed data uncompressed in the cache 107, latency problems are reduced.

Figure 2:
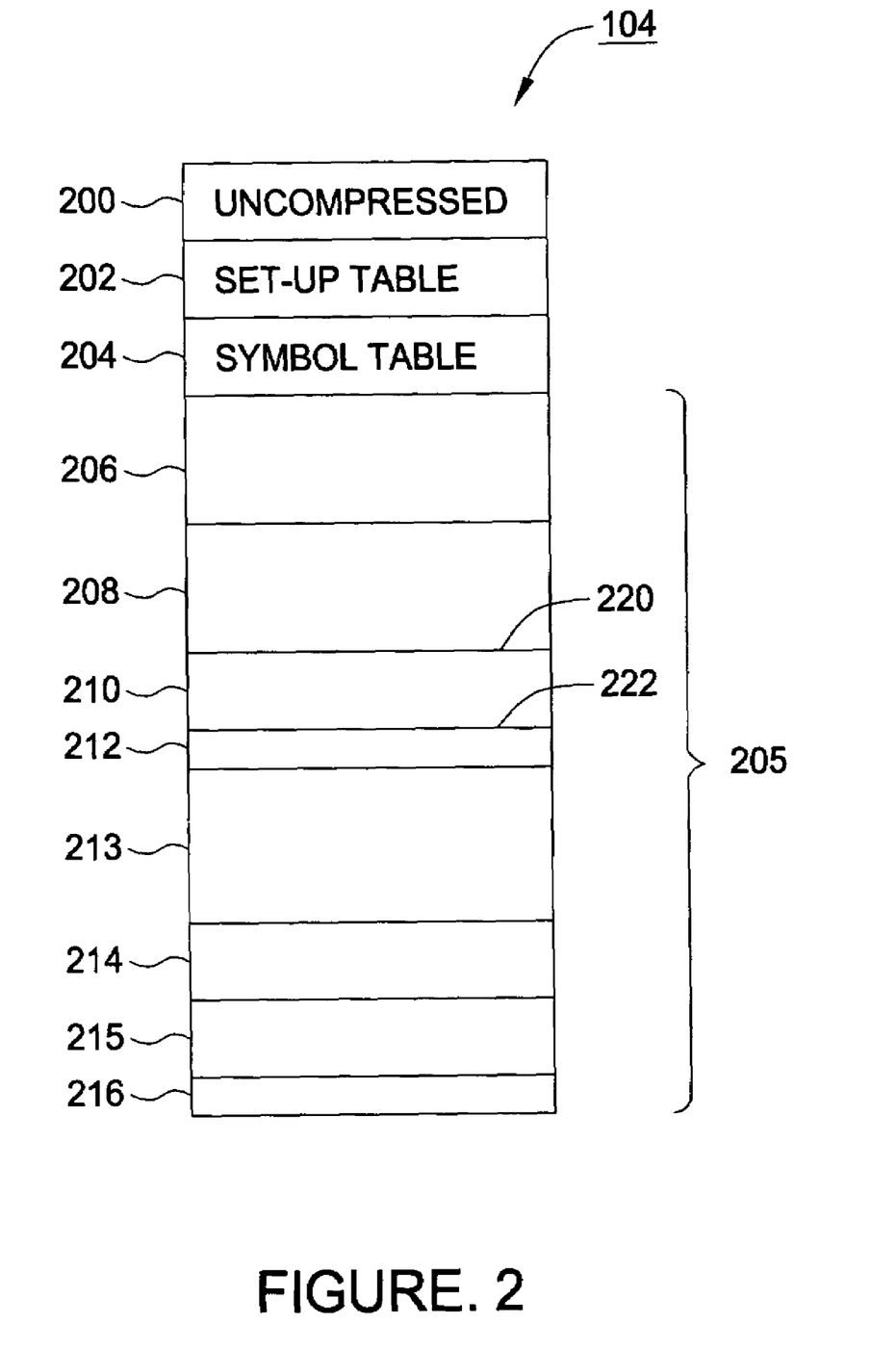
FIG. 2 schematically illustrates a memory device storing both compressed and uncompressed data.

FIG. 2 schematically illustrates an exemplary configuration of the system memory 104. As shown, the system memory 104 is partitioned into an uncompressed section 200, a setup table 202, a symbol table 204, and a compressed section comprised of storage areas 206 through 216. The storage areas 206 through 216 are in general different sizes, with the sizes being related to how efficiently the compression technique can compress specific fixed-length blocks of data. Typically an uncompressed data block is stored in a memory page, with that page having a fixed dimension, e.g., 4096 bytes. The uncompressed section stores frequently referenced data to reduce latency issues. As will be described below with reference to FIG. 3, to further reduce latency, frequently referenced data may also be stored (uncompressed) in cache 107.

The compressed partition of main memory, generally stores less often accessed data (which is compressed). The setup table identifies the locations of compressed data stored within the compressed section. For example, the setup table contains the starting address 220 and ending address 222 of storage area 210. This enables access of the compressed data in the storage area 210. The symbol table includes symbol-to-data transformations used in the compression method. For example, frequently occurring characters (e.g., spaces and zeroes) typically represented by 8-bits, may be represented by a 2-bit symbol. Such symbol tables are usually created during compression (e.g., by scanning for frequently occurring characters) and can result in very efficient data compression.

A Memory Architecture for Adaptive Compression

Figure 3:
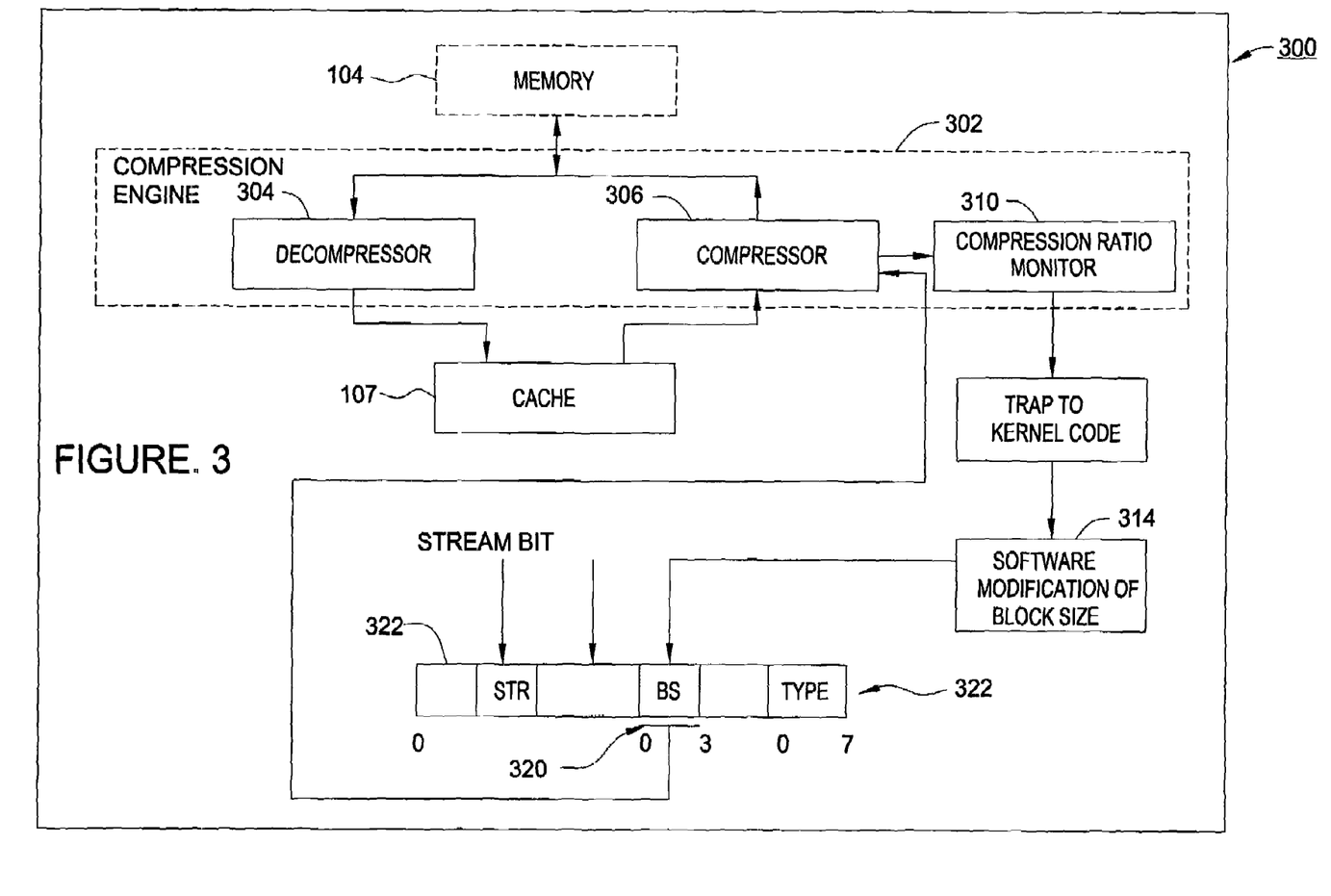
FIG. 3 is a schematic depiction of a memory system that is in accord with the principles of the present invention.

While FIG. 1 schematically illustrates the hardware of a computer that incorporates the principles of the present invention, and FIG. 2 illustrates the memory itself, FIG. 3 schematically illustrates an overall memory architecture 300 of the computer 100. As shown, the memory architecture 300 includes a data compression engine 302 having both a decompressor 304 and a compressor 306. The data compression engine 302 will usually be hardware implemented to improve speed, which reduces latency.

As previously described, the memory architecture 300 also includes a cache 107. The cache 107 is high speed memory that provides working storage registers for the processor 102 (see FIG. 1). When compressed data in the system memory 104 is required by the processor 102, the compressed data is called from the system memory 104 and applied to the decompressor 304. The decompressor decompresses the compressed data and supplies it to the cache memory 107. In turn, when the cache 107 is done with data (e.g., as determined by a least-recently used technique) it applies that data to the compressor 306. The compressor 306 then compresses that data and stores the compressed data in system memory 104.

The particular algorithm used by the compressor 306 works on blocks of data. Exemplary block sizes include, but are not limited to, 256, 512, 1024, 2048, and 4096 bytes. The particular block size that is used represents a trade-off between compression efficiency, which favors a large block size, and latency issues associated with decompressing data, which favors a small block size. The compression ratio, and thus the apparent memory size, depends on the block size used during compression. During normal operation, in which the system memory 104 is filled below a threshold value, the block size that is used during compression is set at a value that provides good latency performance, e.g. a block size of 512 bytes.

The compression engine 302 also includes a compression ratio monitor 310 generally configured to generate a dynamic compression ratio from one or more actual achieved compression ratios (e.g., by maintaining an average of compression ratios achieved over a period of time, a running average, or the like). Compression ratios may be calculated, for example, by dividing the specified block size (uncompressed) by the compressed block size. In other words, if a 4 KB block of data is compressed to a 2 KB block, the compression ratio would be 2. The compression ratio monitor may be further configured to compare calculated compression ratios (or a running sum or average) to a specified threshold compression ratio.

In other words, if the dynamic compression ratio fall below the threshold compression ratio, an expected level of compression may not be achieved and, therefore, the amount of apparent memory expected by a developer may quickly be consumed. As an example, if a compression ratio of 2 is expected, a developer may expect 512 MB of memory to be able to store 1 GB of compressed data. However, if the dynamic compression ratio achieved is only 1.5, the same 512 MB will only be able to store 768 MB of compressed data, which may present problems if an application has allocated memory expecting 1 GB.

Therefore, in an effort to prevent such problems, the compression ratio monitor 310 may be configured to notify software (e.g., a running application or operating system kernel code), which may take measures to improve compression ratio, such as increasing block size, changing a type of compression algorithm used, and the like. In order to make an intelligent decision regarding what measures are appropriate, the software may examine one or more system parameters. For example, the software may examine a list of tasks currently running to determine whether such tasks involve data that is likely to be further compressed with an increased block size (e.g., graphical data may be more compressible than other types due to repeated data in common scene elements). The software may also examine the amount of available (remaining) system memory, in deciding what block size to choose. In other words, if the system memory is almost full, more aggressive compression may be required and the block size may be increased substantially.

In any case, if the software determines increasing the block size will likely result in increased compression ratios, the software may increase the block size. The larger block size should result in a larger compression ratio, which makes the system memory 104 appear larger. "Should" is used because, as noted, some data types simply do not compress well. While the larger block size increases the compression ratio it does so at the cost of increased latency. While increased latency is detrimental, it is less so than problems caused by overfilling system memory 104. Latency problems can be minimized if the block size is increased only to the next available size. If problems continue, then the next larger block size can be used.

As illustrated, the software may increase the block size (as shown in block 134), by modifying one or more block size (BS) control bits 322 in a compression control register (CCR) 320. As illustrated, the compressor 304 may utilize this new block size when subsequent data (e.g., least recently used data from cache 107) is to be compressed and stored in system memory 104. Of course, the compression ratio monitor 310 may continue to monitor achieved compression ratios and generate subsequent software traps if the compression monitored compression ratios continue to fall below the threshold. In response, the software may again increase the compression block size.

In some cases, when the software is signaled by a hardware generated trap that the threshold compression ratio is not being met, the software may not increase the block size. For example, if the dynamic compression ratio is less than the threshold, but not a lot of data is being stored, the system memory 104 may have significant memory space available for the application. Further, as previously described, the data involved in some tasks may not be very compressible. In such cases, the software may take no other action, but may continue to monitor the status of the system memory 104, for example, until the available memory falls below another minimum capacity level (e.g., the memory is nearly full). As will be described in greater detail below, if the available memory falls below this minimum capacity level, data already compressed using a first block size may be recompressed using a second, large block size, in an effort to free up more memory.

Figure 4:
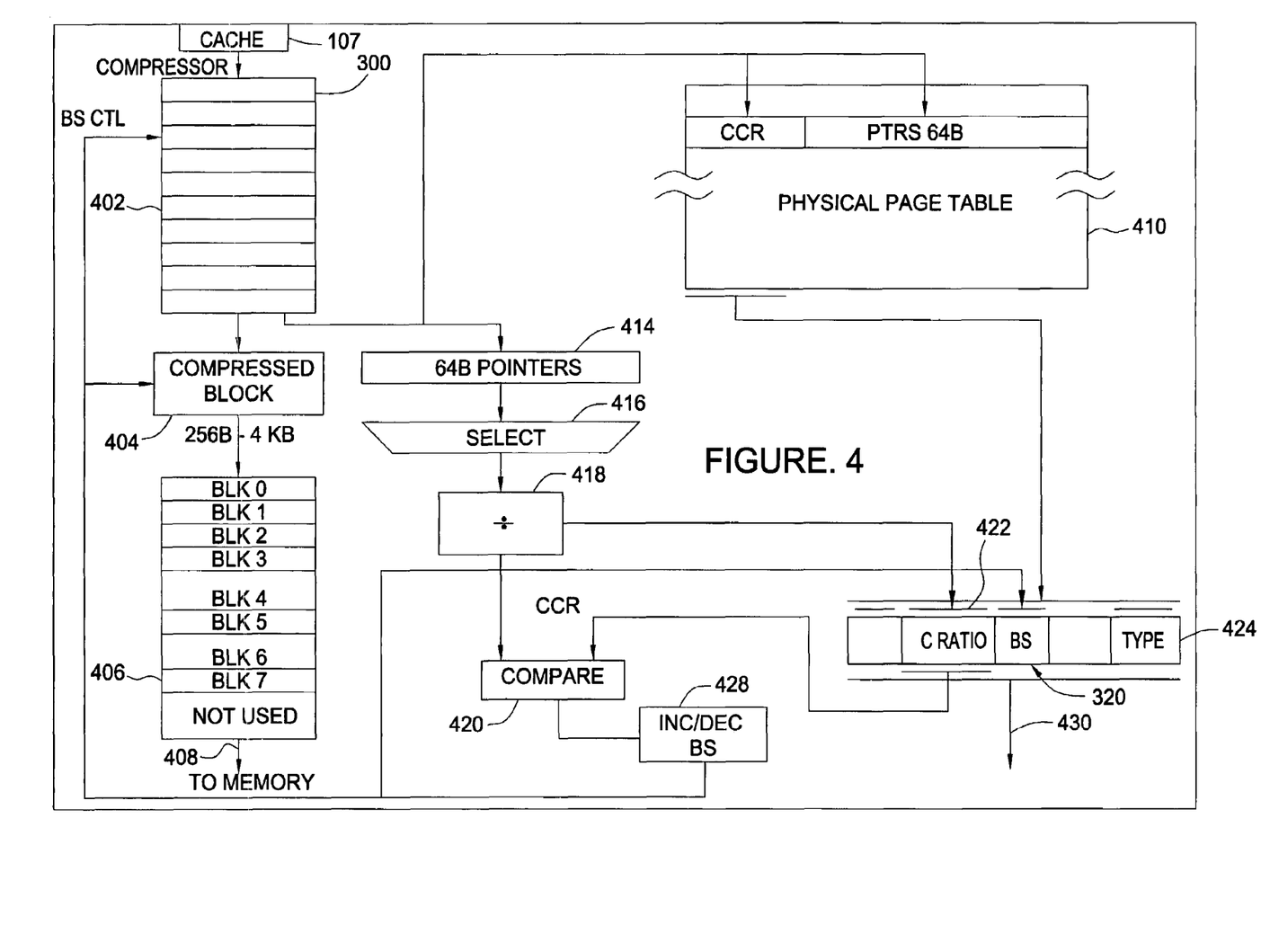
FIG. 4 schematically illustrates the memory system of FIG. 3 in a manner that emphasizes compression control and data flow.

While the schematic depiction of the memory architecture 300 shown in FIG. 3 is beneficial, because of the interaction of hardware and software viewing the memory architecture 300 from another perspective may be helpful. FIG. 4 illustrates the memory architecture 300 from the viewpoint of compression control and data flow. As shown, the cache memory 107 sends data to be compressed to the compressor 306. That data is stored as words in a fixed size memory block (e.g., 512 bytes). The fixed size memory block is illustrated by the registers 402 of the compressor 306. When the memory block is full, that is, when the memory block reaches the fixed size, the compressor compresses the data into a compressed block 404. That compressed block is transferred to a compressed page buffer, which then stores that compressed block and a number of other compressed blocks until the compressed memory page is relatively full (e.g., approaches 4096 bytes). That compressed page is then stored into long term memory (which is not shown in FIG. 4) along a bus 408.

To track where particular information is stored, the compressor 306 sends compressed block locator data to a physical page table 410. That table stores CCR information for the compressed block. The CCR information provides, among other things, information about the compression control, including how large the memory block was before compression. That is, what the block size control BS 320 was during compression. As previously noted, typical memory block sizes include 256, 512, 1024, 2048, and 4096 bytes. The physical page table also includes pointers to the data so that the data can be accessed as required.

To determine the compression ratio, the pointers to the compressed data are interrogated to find the start 414 and end 416 of a compressed block. This provides the compressed block size. Then, that size is divided 418 by the actual block size used (specified by control bits BS 322) to determine the achieved compression ratio (in FIG. 4, a number between 0 and 1). Of course, for other embodiments, the actual block size used may be divided by the compressed block size, resulting in a compression ratio greater than 1.

In any case, the achieved compression ratio is then compared 420 with the compression ratio 422 specified in the CCR 424. If the compression ratio is insufficient (indicating a possible memory fill) or is excessive (indicating a possible latency problem) the compression ratio is incremented or decremented at block 428, either by increasing the block size used during compression or by some other compression control. The new compression ratio 422 is written to the CCR, to be stored in the physical page table 410 (e.g., to indicate to software how efficiently the block is compressed). The CCR information is written into the physical page table 410, for later use. For example, during decompression, the block size that was used is available from the stored CCR information in the physical page table 410.

Exemplary Operations for Adative Compression

Operation of the memory architecture 300 of FIGS. 3 and 4 may be further explained with reference to FIGS. 5 and 6 which illustrate exemplary operations for adaptive compression illustratively performed in hardware and software, respectively. While the operations of FIG. 5 are assumed to be performed in hardware (while software implementations are possible, such implementations will likely have degraded performance).

At step 506, data is compressed using a specified block size and, at step 508, a dynamic compression ratio is calculated. For example, the block size bits BS 320 information is applied to the compressor 306 and to the compression ratio monitor 310 (see FIG. 3). The compressor 306 compresses the data using the block size specified by the block size bits BS 320 (step 506) to form compressed blocks that have dimensions that are applied to the compression ratio monitor 310. The compression ratio monitor 310 is thus informed as to both the block size of the uncompressed data (represented by BS 320) and the actual compressed block size. This enables the compression ratio monitor 310 to calculate a compression ratio. The dynamic compression ratio may be a running average of compression ratios calculated over a period of time, or any other combination of one or more compression ratios.

In any case, at step 510, if the dynamic compression ratio is above the minimum threshold, at step 512 the compressed data and the compression control information are stored. However, if the dynamic compression ratio monitor 310 determines that the dynamic compression ratio is below the minimum threshold, a software trap is generated, at step 514, prior to storing the compressed data, at step 512.

Figures 5, 6:
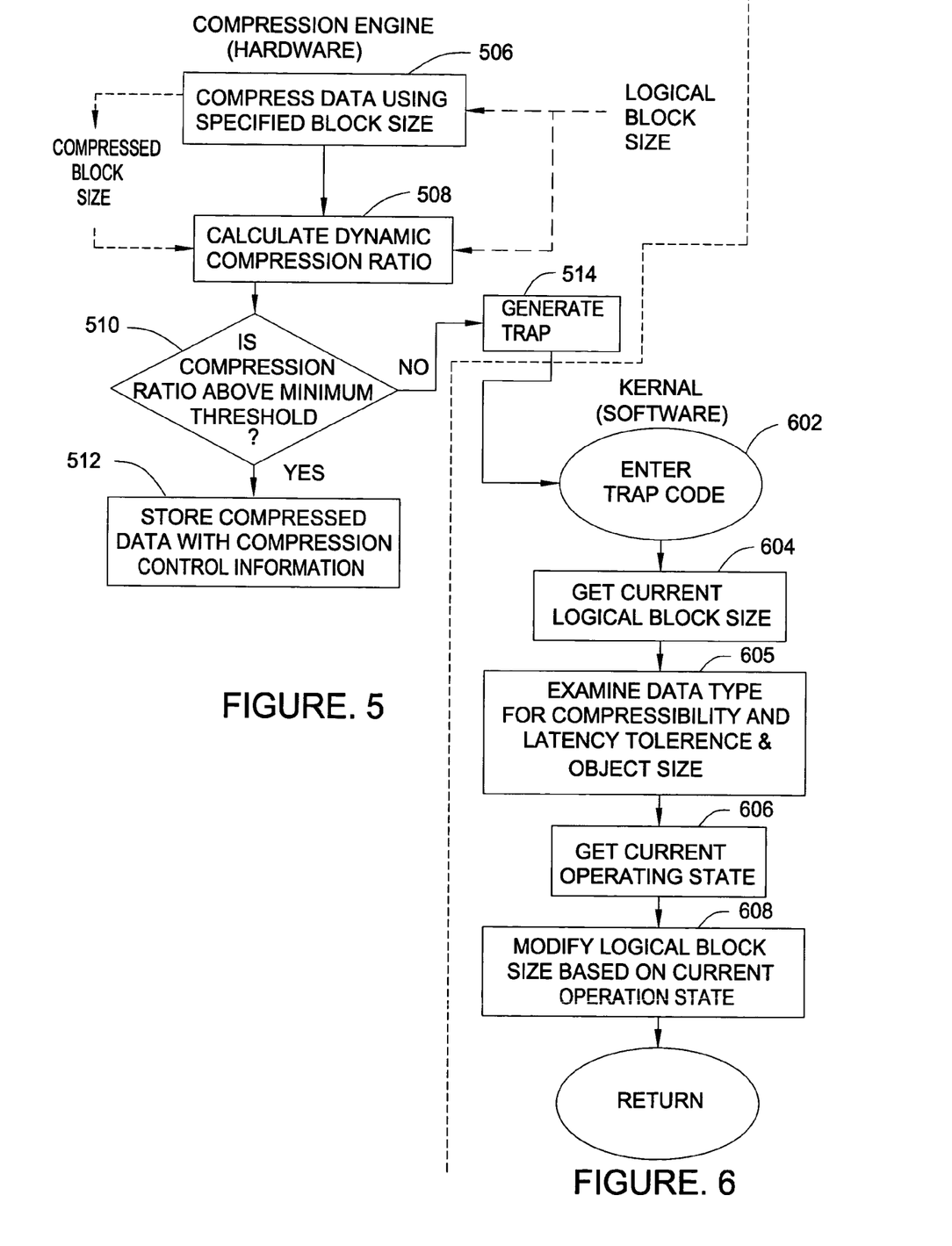
FIG. 5 is a flow diagram of the compression engine used in the memory system of FIGS. 3 and 4.
FIG. 6 is a flow diagram of trapping to software within the memory system of FIGS. 3 and 4.

FIG. 6 illustrates exemplary operations the software may take, for example, as part of a software trapping routine, entered at step 602. At step 604, the current logical block size is obtained (e.g., by examining the physical CCR register currently used by the compression engine). At step 605 the data type is examined for compressibility, latency tolerance, and object size. This is performed because some data types, such as those previously compressed using a lossy compression technique such as JPEG data, simply will not compress or, if compressed, may require more room after compression. Other data should not be compressed, such as data have latency sensitivity and data that is just too small to compress efficiently. At step 606 the software obtains the current operating state of the system. As previously described, the operating state may include the amount of available memory remaining (e.g., how full is the memory), the current tasks running on the software, and the like. At step 608, (if the software determines changing the block size will improve compression), the block size is changed, based on the current operating state.

In some cases, the software may not wait for a hardware trap, but may periodically monitor the compression ratio, for example, by examining the CCR registers stored in the page table 410 as part of the operating system's normal page and storage management function. If the stored compression ratios have increased sufficiently (e.g., above the minimum threshold level), the software may decrease the block size, in an effort to reduce latency associated with compression using larger block sizes.

Data Recompression

As previously described, some types of data may not be compressed sufficiently to achieve the minimum threshold compression ratio and, as a result, the main memory may reach a nearly full state regardless of the block size. In such a case, to reduce the chance of memory overflow, the memory architecture 300 may initiate a process in which data that was previously compressed with a given block size is recompressed using a larger block size.

Figure 7:
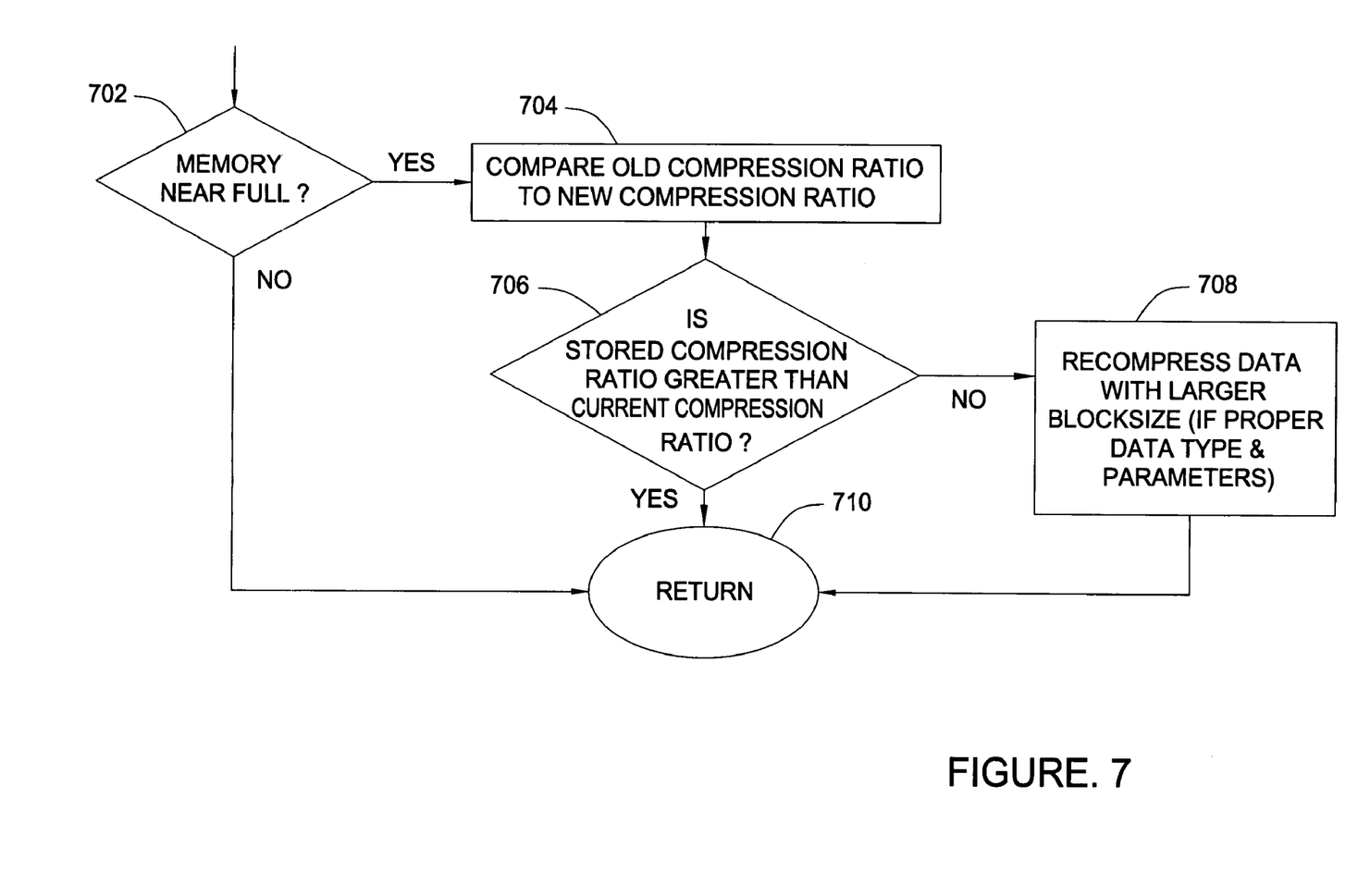
FIG. 7 is a flow diagram of compression ratio code used in the memory system of FIGS. 3 and 4.

FIG. 7 illustrates exemplary operations for recompression that may be performed, for example, periodically in software. At step 702, a determination is made as to whether the memory is nearly full (e.g., has fallen below a minimum threshold capacity). If not, processing returns to normal, at step 710. However, if the compressed memory is nearing full, at step 704, the compression ratio of already compressed data is compared to the current dynamic compression ratio. Recall that the compression ratio for compressed blocks may be stored with the CCR in the physical page table 410 (see FIG. 4), which may be interrogated to compare the achieved compression ratios of previously stored data with the compression ratios currently being achieved.

At step 706, if the stored compression ratios are above the current dynamic compression ratio, there is no advantage to recompress data and the process returns to its normal operation, at step 710. However, if the stored compression ratios are below the current dynamic compression ratio, then at step 708, previously stored data is uncompressed and then recompressed using a larger block size (e.g., the current block size indicated by bits BS 322 in the CCR), if one exists. A check should be performed to prevent recompression of data that will not benefit from recompression, such as JPEG data or other data compressed using a lossy compression technique. For some embodiments, rather than examine the originally achieved compression ratio, the software may simply access the original block size used for compression, and recompress using a larger block size (if possible). In any event, after recompression operation returns to normal at step 710. In any case, while the recompression operations may result in significant latency, the memory space that may be freed up by the operations may outweigh the latency. Possible alternatives of losing data or having to offload data to disk may result in much greater penalties.

CONCLUSION

Embodiments of the present invention provide a hardware-assisted memory compression architecture configured to adaptively control one or more compression parameters, in an effort to maintain a desired level of compression. By maintaining the desired level of compression, a desired amount of apparent memory may be presented to an application. Due to the compression, the apparent memory may be significantly larger than the actual physical memory, thus potentially reducing overall system cost significantly by reducing the amount of actual memory required.

While the foregoing is directed to embodiments of the present invention, other and further embodiments of the invention may be devised without departing from the basic scope thereof, and the scope thereof is determined by the claims that follow.

The invention claimed is:

1. A method of compressing memory, comprising:
 compressing data using a selected data block size to generate compressed blocks of data;
 storing the compressed blocks of data in a memory having a physical storage size;
 calculating a dynamic compression ratio calculated based on the selected data block size and the size of the compressed blocks; and
 increasing the data block size, in response to determining the dynamic compression ratio has fallen below a threshold level
 wherein said memory is divided into a plurality of pages and includes a page table comprising a plurality of pointers that link to said pages and corresponding block sizes used to compress said pages.

2. The method of claim 1, wherein calculating the dynamic compression ratio is performed in hardware.

3. The method of claim 2, wherein increasing the data block size is performed in software.

4. The method of claim 3, wherein the software increases the data block size only if the available capacity of the memory is below a predetermined level.

5. The method of claim 3, wherein the software periodically monitors the available capacity of the memory and, if the available capacity of the memory is below a threshold value, initiates recompression of data previously compressed with a first data block size, using a second larger block size.

6. A system, comprising:
 a processor for processing data;
 a cache for storing, in an uncompressed format, data accessed by the processor;
 a compressed memory for storing data accessed by the processor in a compressed format; and
 an executable component configured to monitor the available capacity of the compressed memory and, if the available capacity is below a threshold level, recompress data in the compressed memory previously compressed using a first block size, using a second larger block size
 wherein said compressed memory is divided into a plurality of pages and includes a page table comprising a plurality of pointers that link to said pages and corresponding block sizes used to compress said pages.

7. The system of claim 6 wherein the page table further comprises block size data and a compression ratio corresponding to each page.

8. The system of claim 7, wherein the executable component is configured to periodically interrogate the page table to examine compression ratios for pages stored in the compressed memory.

9. A memory architecture for use with a computing device, comprising:
 a compressed memory for storing compressed data;
 a compression control register comprising at least block size data; and
 a compression engine having a compressor for compressing blocks of uncompressed data from a cache for storage in said compressed memory, wherein a size of the blocks of uncompressed data is defined by the block size data, and a compression monitor for monitoring achieved compression ratios and for providing an indication when the achieved compression ratios fall below a predetermined threshold level, wherein the compression engine changes the block size data in response to the achieved compression ratio falling below the predetermined threshold level.

10. The memory architecture of claim 9 wherein said compressed memory is divided into a plurality of pages.

11. The memory architecture of claim 9 wherein said compressed memory includes a setup table comprises a plurality of pointers that link to said pages.

12. The memory architecture of claim 9 wherein, for each page of memory, a corresponding value of the compression control register is stored in a page table.

13. The memory architecture of claim 9 wherein said compression engine further includes a decompressor for decompressing compressed data to be stored in the cache.

14. The memory architecture of claim 9, wherein the compression ratio monitor provides an indication by generating a trap to software.

15. The memory architecture of claim 14, wherein the memory architecture further comprises a compression control register readable by software, wherein the compression control register comprises at least a block size.

16. A system, comprising:
a processor for processing data;
a cache for storing, in an uncompressed format, data accessed by the processor;
a compressed memory for storing data accessed by the processor in a compressed format;
a compression engine having a compressor for compressing blocks of uncompressed data from the cache for storage in the compressed memory, wherein the size of the blocks of data that are compressed by said compressor are controlled by block size data, and a compression monitor for generating a software trap when achieved compression ratios fall below a predetermined threshold level; and
an executable component configured to change the block size data in response to detecting the software trap, wherein the executable component is configured to change the block size data by writing to a compression control register accessed by the compression engine.

17. The system of claim 16, wherein the executable component is a game.

18. The system of claim 16, wherein the executable component is configured to change the block size data based on one or more system parameters.

19. The system of claim 18, wherein the one or more system parameters comprises at least one of: one or more currently running tasks and a fill state of said compressed memory.

20. The system of claim 16 wherein said compressed memory is divided into a plurality of pages and includes a page table comprising a plurality of pointers that link to said pages.

21. The system of claim 20 wherein the page table further comprises block size data and a compression ratio corresponding to each page.

22. The system of claim 16 wherein the software is further configured to:
monitor the available capacity of the compressed memory; and
if the available capacity is below a threshold level, recompress data previously compressed using a first block size, using a second larger block size.

* * * * *